United States Patent
Wiinikka et al.

(10) Patent No.: US 10,836,476 B2
(45) Date of Patent: Nov. 17, 2020

(54) ROTORCRAFT CENTRIFUGAL FORCE BEARING

(71) Applicant: Textron Innovations Inc., Providence, RI (US)

(72) Inventors: Mark Adam Wiinikka, Hurst, TX (US); Nathan Patrick Green, Mansfield, TX (US); John R. McCullough, Weatherford, TX (US)

(73) Assignee: Textron Innovations Inc., Providence, RI (US)

( * ) Notice: Subject to any disclaimer, the term of this patent is extended or adjusted under 35 U.S.C. 154(b) by 232 days.

(21) Appl. No.: 15/666,449

(22) Filed: Aug. 1, 2017

(65) Prior Publication Data

US 2019/0039727 A1 Feb. 7, 2019

(51) Int. Cl.
*B64C 27/35* (2006.01)
*B64C 27/37* (2006.01)
*B64C 27/48* (2006.01)

(52) U.S. Cl.
CPC ............ *B64C 27/35* (2013.01); *B64C 27/37* (2013.01); *B64C 27/48* (2013.01)

(58) Field of Classification Search
CPC ....... B64C 27/35; B64C 27/48; F16C 23/043; F16C 27/02; F16F 1/373; F16F 1/3732; F16F 1/393; F16F 1/3935; F16F 1/52; F16F 1/54
See application file for complete search history.

(56) References Cited

U.S. PATENT DOCUMENTS

| 4,028,002 | A | * | 6/1977 | Finney | B64C 27/35 416/134 A |
| 4,257,739 | A | * | 3/1981 | Covington | B64C 27/35 416/134 A |
| 6,910,865 | B2 | * | 6/2005 | Pancotti | B64C 27/32 416/134 A |
| 8,857,756 | B2 | * | 10/2014 | Chrestensen | B64C 27/48 244/17.11 |
| 8,926,281 | B2 | * | 1/2015 | Stamps | B64C 27/35 416/134 A |
| 9,156,544 | B2 | * | 10/2015 | Wiinikka | B64C 27/605 |
| 9,347,487 | B2 | * | 5/2016 | Anderson | F16C 27/063 |
| 9,764,831 | B2 | * | 9/2017 | Jarrett | B64C 27/35 |
| 2007/0189649 | A1 | * | 8/2007 | Montazeri | F16C 11/0614 384/192 |

(Continued)

*Primary Examiner* — Nathaniel E Wiehe
*Assistant Examiner* — John S Hunter, Jr.
(74) *Attorney, Agent, or Firm* — Slater Matsil, LLP

(57) ABSTRACT

A centrifugal force (CF) bearing for a rotorcraft rotor assembly includes an inner-member, an outer-member, and an elastic member interposed between the inner- and outer-members. The outer-member includes an upper flange extension and a lower flange extension for location to and engagement with a grip. The upper flange extension is disposed over an upper surface portion of the elastic member, and the lower flange extension is disposed under a lower surface portion of the elastic member. The CF bearing is configured for attachment to a grip of the rotor assembly. The outer-member is configured to communicate mechanical loads (e.g., centrifugal force, lateral shear, vertical shear) from the grip to the yoke during operation of the rotor assembly.

20 Claims, 9 Drawing Sheets

(56) References Cited

U.S. PATENT DOCUMENTS

2015/0078909 A1* 3/2015 Wiinikka ................ B64C 27/48
  416/225
2015/0322287 A1* 11/2015 Ishmael ............... C09D 163/00
  244/17.11

* cited by examiner

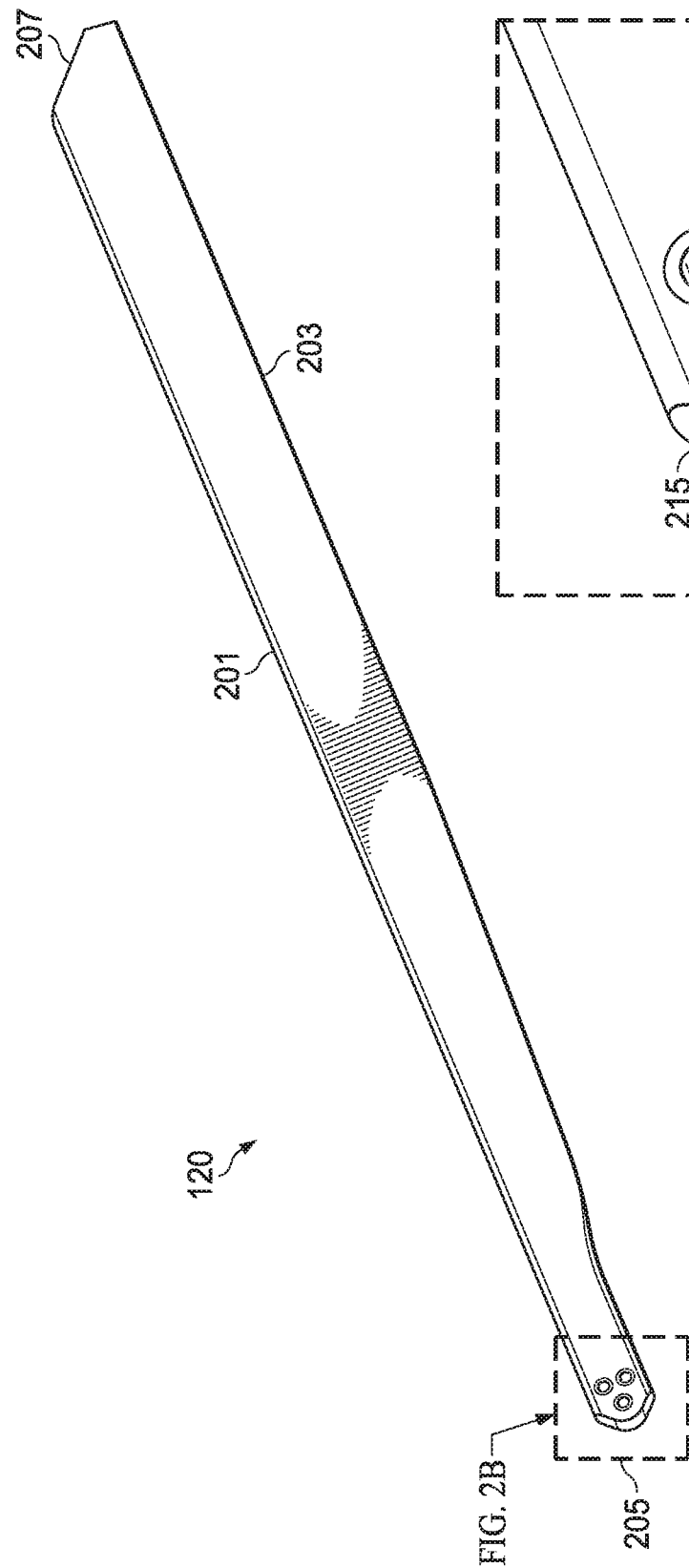
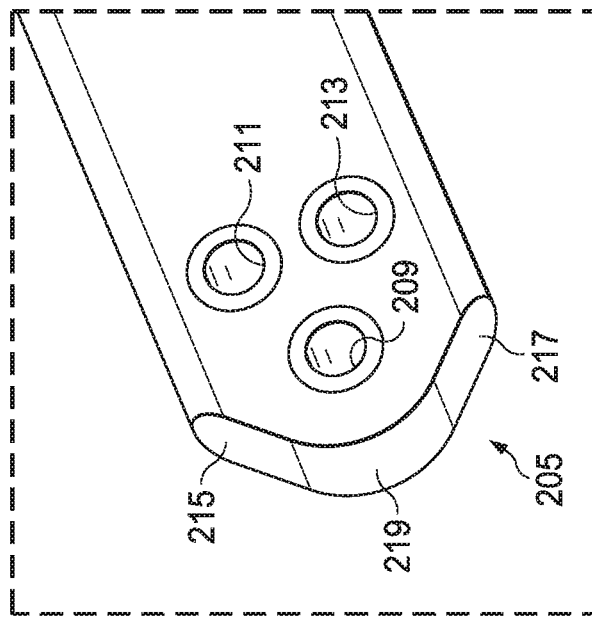
FIG. 2A
FIG. 2B

ROTORCRAFT CENTRIFUGAL FORCE BEARING

TECHNICAL FIELD

The present disclosure generally relates to a rotorcraft rotor assembly apparatus, and more specifically to a structural system and method for coupling a rotor blade to a rotor hub using a centrifugal force bearing.

BACKGROUND

There are a variety of conventional approaches for attaching rotor blades to rotor hubs. Though developments in rotor blade attachment mechanisms have been made, substantial room for improvement remains. For example, there is a need for an improved apparatus, structural system, and method for operably coupling a rotor blade to a rotor hub using a centrifugal force bearing.

SUMMARY

General aspects of the disclosure herein describe a centrifugal force (CF) bearing apparatus for a rotorcraft. The CF bearing includes an outer-member having a pair of flange extensions for positive engagement with an inner surface of a grip. The CF bearing has a first (outer) member, a second (inner) member, and a third (interposing) member. The third member is disposed between the first member and the second member. The first member includes an exterior surface having an upper flange extension and a lower flange extension. The upper flange extension is disposed above an upper portion of the third member. The lower flange extension is disposed below a lower portion of the third member.

Other general aspects describe a rotor assembly system that includes a rotor grip configured for attachment to a rotor blade, a yoke, and a CF bearing. The CF bearing includes an inner-member, an outer-member, and an elastic member (e.g., formed from an elastomeric material, such as vulcanized rubber, or the like) disposed between the inner-member and the outer-member. The outer-member is attached to a portion of the rotor grip. The outer-member includes an upper flange in contact with an upper portion of the rotor grip. The outer-member also includes a lower flange in contact with a lower portion of the rotor grip. The upper flange is disposed over an uppermost surface portion of the elastic member, and the lower flange is disposed under a lowermost surface portion of the elastic member.

Yet other general aspects describe a main rotor (MR) CF bearing of an articulated rotor system. The MR CF bearing is configured to efficiently transmit at least one of centrifugal force, lateral shear, or vertical shear mechanical loads into an MR yoke, whereby stress in the MR CF bearing and MR yoke (or other mating part) is reduced.

Still other general aspects describe a method that includes a step of operating a rotorcraft with an articulated main rotor assembly. The articulated main rotor assembly includes a grip attached to a main rotor blade, a yoke, and a CF bearing disposed between and interposing the grip and the yoke. The CF bearing has an inner-member (e.g., comprising 6Al-4V titanium, or the like), an outer-member (e.g., comprising steel, titanium, or the like), and an elastic member (e.g., including an elastomeric material, such as a polymer, vulcanized rubber, combinations thereof, or the like) that is disposed between and interposes the inner-member and the outer-member. The inner-member is located to and engaged with the yoke by a first clamp. The outer-member is attached to the grip by a second clamp. The outer-member includes an upper flange in contact with an upper portion of the grip, and a lower flange in contact with a lower portion of the grip. The upper flange is disposed over an uppermost portion/surface of the elastic member, and the lower flange is disposed under a lowermost portion/surface of the elastic member. Other embodiments of these general aspects include corresponding apparatuses, each configured to perform actions of the methods.

Representative embodiments of the disclosure may provide one or more technical advantages. A technical advantage of one embodiment may include a capability to provide improved communication of mechanical loads (e.g., centrifugal force, lateral shear, vertical shear, or the like) from a rotor grip to a rotor yoke through a CF bearing. Another technical advantage of an embodiment may include a capability to reduce mechanical stress in a CF bearing and corresponding mating assembly (e.g., rotor grip). Yet another technical advantage of an embodiment may include a capability to reduce fatigue or mechanical failure of an MR CF bearing-to-grip joint attending operation of a main rotor assembly of a rotorcraft.

Certain embodiments may include some, all, or none of the above advantages. One or more other technical advantages may be clear to those skilled in the art upon review of the Figures, descriptions, and claims included herein.

BRIEF DESCRIPTION OF THE DRAWINGS

Representative aspects of the present disclosure may be understood from the following detailed description when read in conjunction with the accompanying Figures. It is noted that, in accordance with standard practice in industry, various features may not be drawn to scale. For example, dimensions of various features may be arbitrarily increased or reduced for clarity of illustration or description. Corresponding numerals and symbols in different Figures generally refer to corresponding parts, unless otherwise indicated.

FIG. 2A representatively illustrates a main rotor blade in accordance with an embodiment.

FIG. 2B illustrates a detailed view of a root end of the main rotor blade as shown in FIG. 2A.

DETAILED DESCRIPTION

Representative embodiments are discussed in detail below. It should be appreciated, however, that concepts disclosed herein may be embodied in a variety of contexts, and that specific embodiments discussed herein are merely illustrative and are not intended to limit the scope of the claims. Furthermore, various changes, substitutions, or alterations can be made herein without departing from the spirit and scope as defined by the appended claims.

Figure 1:
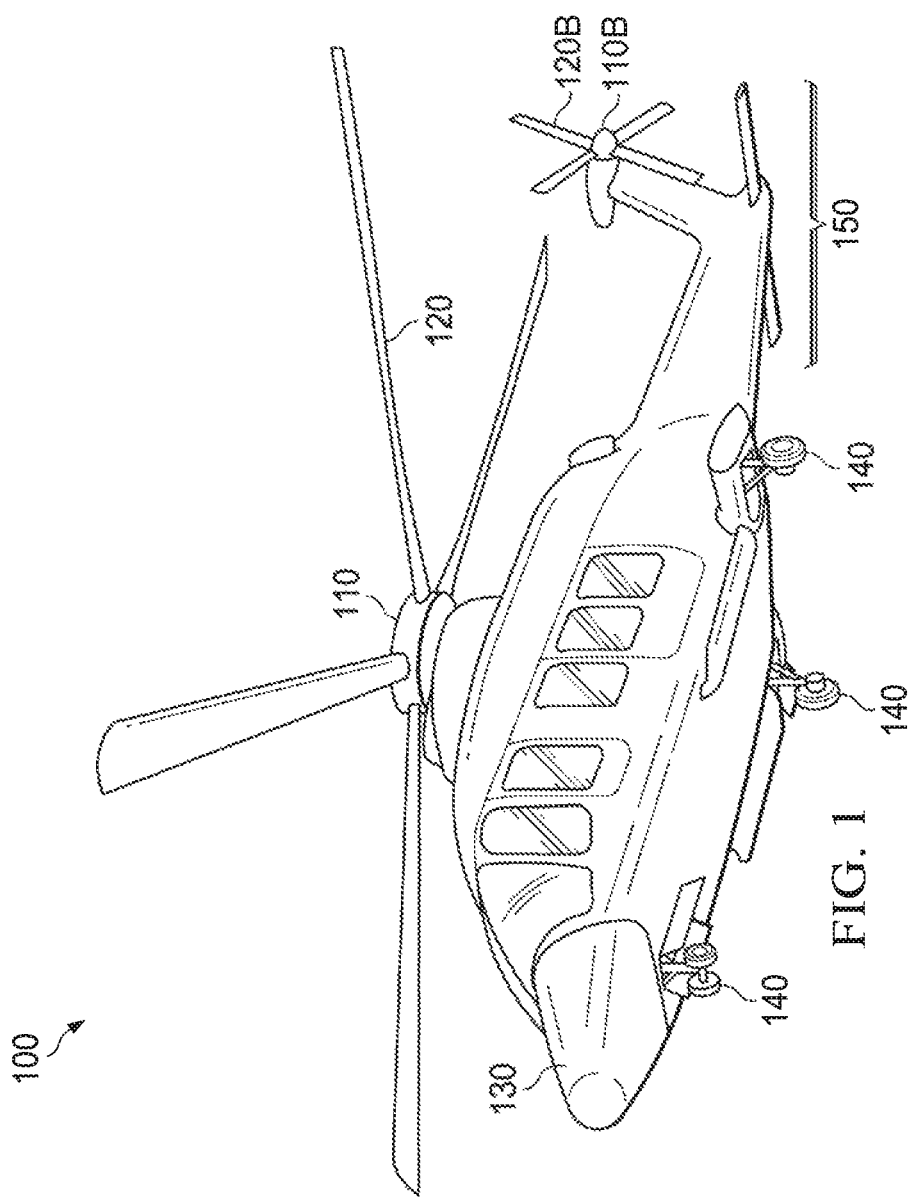
FIG. 1 representatively illustrates a rotorcraft in accordance with an embodiment.

FIG. 1 illustrates a rotorcraft 100 according to a representative embodiment. Rotorcraft 100 includes main rotor system 110, main rotor blades 120, fuselage 130, landing gear 140, and tail boom 150. Main rotor system 110 may rotate main rotor blades 120. Main rotor system no may include a control system for selectively controlling pitch of each blade 120 to selectively control direction, thrust, and lift of rotorcraft 100. Fuselage 130 comprises the body of rotorcraft 100 and may be coupled to main rotor system 110 such that main rotor system 110 and main rotor blades 120 move fuselage 130 through the air in flight. Landing gear 140 support rotorcraft 100 during landing or when rotorcraft 100 is at rest on the ground. Tail boom 150 represents the rear section of rotorcraft 100 and has components of tail rotor system 110 and tail rotor blades 120. In a representative embodiment, tail boom 150 may also include mechanical linkage (not illustrated) to a powerplant (not illustrated) driving main rotor system no. Tail rotor blades 120B counter torque effect created by main rotor system no and main rotor blades 120. Teachings of certain embodiments relating to rotor systems described herein may apply to main rotor system no or other rotor systems (e.g., tilt rotorcraft, tandem rotorcraft, or other helicopter rotor systems). It should also be appreciated that representative embodiments may apply to aircraft other than a rotorcraft.

A pilot may manipulate one or more pilot flight controls to achieve controlled aerodynamic flight. Inputs provided by the pilot to the pilot flight controls may be transmitted mechanically or electronically to flight control devices. Flight control devices may include devices operable to change flight characteristics of the aircraft. Representative flight control devices may include a control system operable to change a configuration of main rotor blades 120 or tail rotor blades 120B.

Cyclic pilot flight controls may allow a pilot to impart cyclic configurations to main rotor blades 120. Varied cyclic configurations of main rotor blades 120 may cause rotorcraft 100 to tilt in a direction specified by the pilot. For tilting forward and back (pitch) or tilting side-to-side (roll), the angle of attack of main rotor blades 120 may be altered with cyclic periodicity during rotation of main rotor system 110, thereby creating variable amounts of lift at varied points in the rotation cycle. Alteration of cyclic configuration of main rotor blades 120 may be accomplished by input from a cyclic control assembly (not illustrated).

Collective pilot flight controls may allow a pilot to impart collective configurations (e.g., collective blade pitch) to main rotor blades 120. Collective configurations of main rotor blades 120 may change overall lift produced by main rotor blades 120. For increasing or decreasing overall lift in main rotor blades 120, the angle of attack for all main rotor blades 120 may be collectively altered by equal amounts and at a same time, resulting in ascent, descent, acceleration, or deceleration. Alteration of collective configuration of main rotor blades 120 may be accomplished by input from a collective control assembly (not illustrated).

Anti-torque pilot flight controls may allow a pilot to change the amount of anti-torque force applied to rotorcraft 100. Tail rotor blades 120B may operate to counter torque created by main rotor system no and main rotor blades 120. Anti-torque pilot flight controls may change the amount of anti-torque force applied to change a heading (yaw) of rotorcraft 100. For example, providing anti-torque force greater than the torque effect created by main rotor system no and main rotor blades 120 may cause rotorcraft 100 to rotate in a first direction, whereas providing anti-torque force less than the torque effect created by main rotor system no and main rotor blades 120 may cause rotorcraft 100 to rotate in a second direction opposite the first direction. In some embodiments, anti-torque pilot flight controls may change the amount of anti-torque force applied by changing the pitch of tail rotor blades 120B, thereby increasing or reducing thrust produced by tail rotor blades 120B and causing the nose of rotorcraft 100 to yaw in a direction corresponding to application of input from a pedal assembly (not illustrated).

Rotorcraft 100 may include additional or different anti-torque devices, such as a rudder or a no-tail-rotor (NOTAR) anti-torque device. Conjunctive or alternative anti-torque embodiments may be operable to change an amount of anti-torque force provided by such additional or different anti-torque device or system.

Cyclic trim assemblies and a collective trim assembly are operable to receive and measure mechanical communications of cyclic and collective motions from a pilot. In a representative aspect, cyclic trim assemblies and the collective trim assembly may embody components of a fly-by-wire (FBW) flight control system, and measurements from cyclic trim assemblies and the collective trim assembly may be sent to a flight control computer (FCC) operable to instruct main rotor system 110 to change a position or configuration of main rotor blades 120 based on received or otherwise determined measurements. For example, the FCC may be in communication with actuators or other devices operable to change the pitch or position of main rotor blades 120.

As representatively illustrated in FIGS. 2A and 2B, rotor blade 120 has a leading edge 201, a trailing edge 203, a root end 205, and a tip end 207. It should be appreciated that rotor blade 120 may be configured or otherwise suitably adapted to take on a variety of configurations. For example, rotor blade 120 can have a degree of built-in twist between root end 205 and tip end 207. In another embodiment, rotor blade 120 can have an anhedral tip, or any other desired aerodynamic profile. Rotor blade 120 includes mounting holes 209, 211, and 213, which provide corresponding apertures for bolts 329, 331, and 333, respectively (as shown in FIG. 2B). Thus, further disclosure herein regarding the location of bolts 329, 331, and 333, also applies to the location of holes 209, 211, and 213 on rotor blade 120. It should be appreciated that holes 209, 211, and 213 can include bushings, or the like, located therein as a bearing surface for shanks of bolts 329, 331, and 333, respectively. Rotor blade 120 can include a forward taper 215 and an aft taper 217 that each taper toward a centerline axis of rotor blade 120 until joining at a rounded portion 219. Rounded portion 219 can have a radius as a function of a desired edge distance from, e.g., hole 209.

FIGS. 3-6 representatively illustrate various features of main rotor system 110 (rotor hub) assembly in accordance with an embodiment. Rotor hub 110 includes a yoke 315 coupled to a mast 317. Each rotor blade 120 is coupled to yoke 315 with a grip 319. An inboard portion of each grip 319 is secured within an opening of yoke 315 with centrifugal force (CF) bearing 335. Grip 319 is a single substantially continuous member having an upper extension 337 and a lower extension 339. Rotor blade 120 is attached to the outboard portion of grip 319 with first bolt 329, second bolt 331, and third bolt 333. Pitch horn 323 is interposed between rotor blade 120 and upper and lower extensions 337, 339 of grip 319. Damper 321 is attached between yoke 315 and a damper attachment portion 341 of pitch horn 323.

During operation, dynamic forces act on rotor blade 120 and associated components of main rotor system 110. Primary dynamic forces include a combination of centrifugal force loading in a centrifugal force direction 445, a chordwise bending in a bending direction 447 (see FIG. 4), and a beam-wise bending in a bending direction 649 (see FIG. 6). Such loading is addressed by the attachment mechanism used to attach rotor blade 120 to the grip 319. Additionally, torsional loading about pitch change axis 443 can be experienced from aerodynamic loading, as well as pitch change inputs from pitch horn 323.

Figure 3:
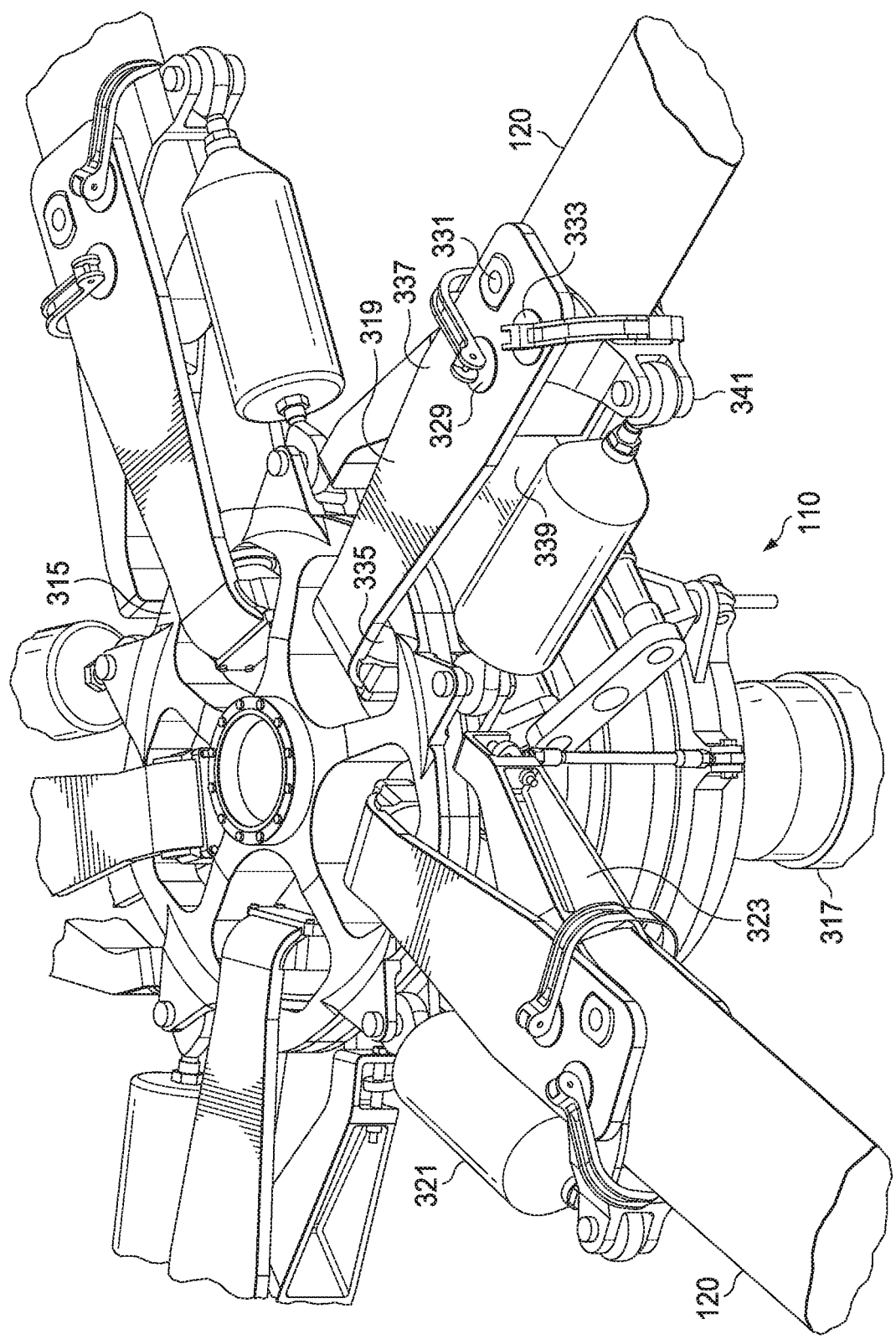
FIG. 3 representatively illustrates a perspective view of a main rotor assembly, in accordance with an embodiment.
Figure 4:
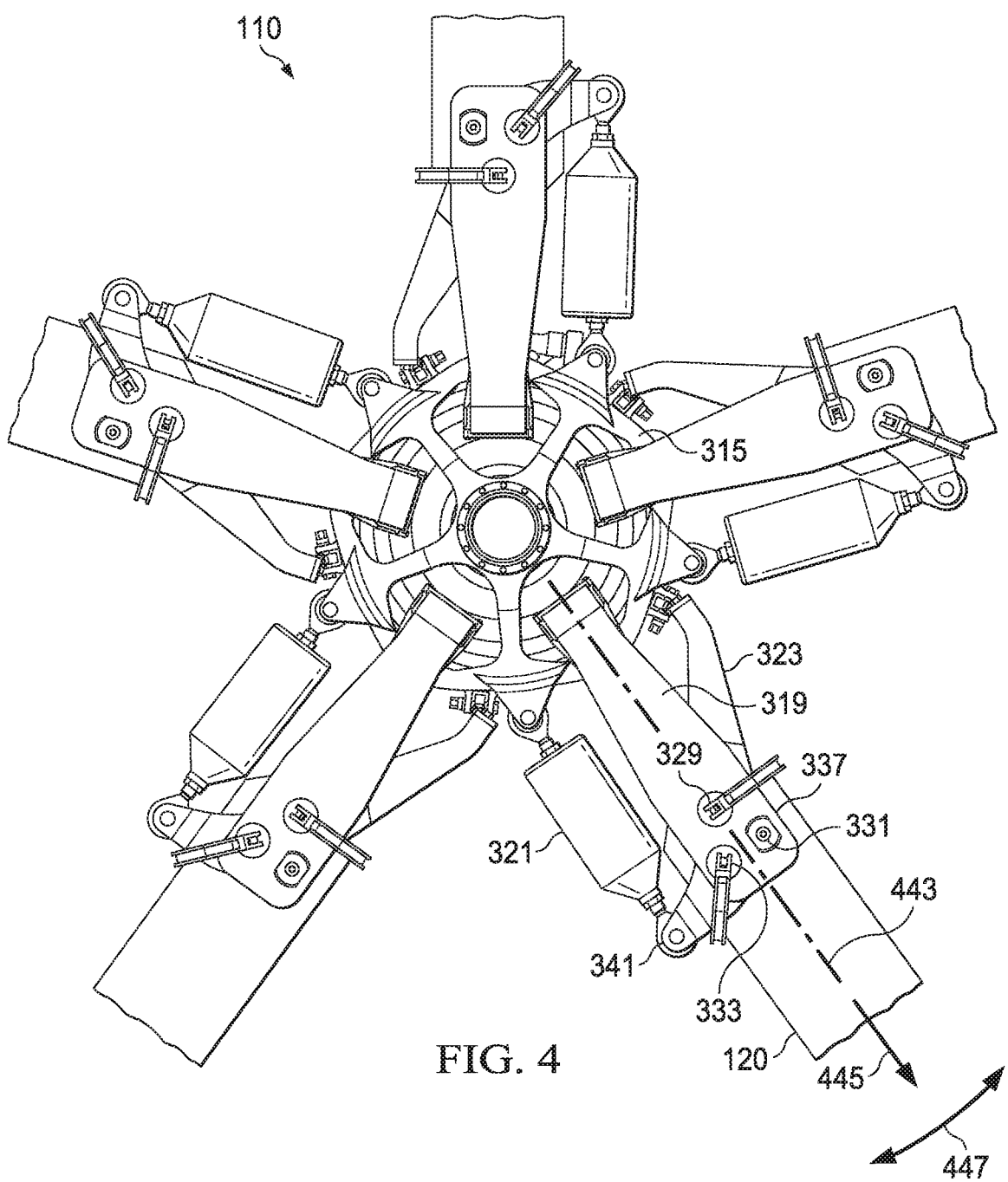
FIG. 4 representatively illustrates a top view of a main rotor assembly, in accordance with an embodiment.
Figure 5:
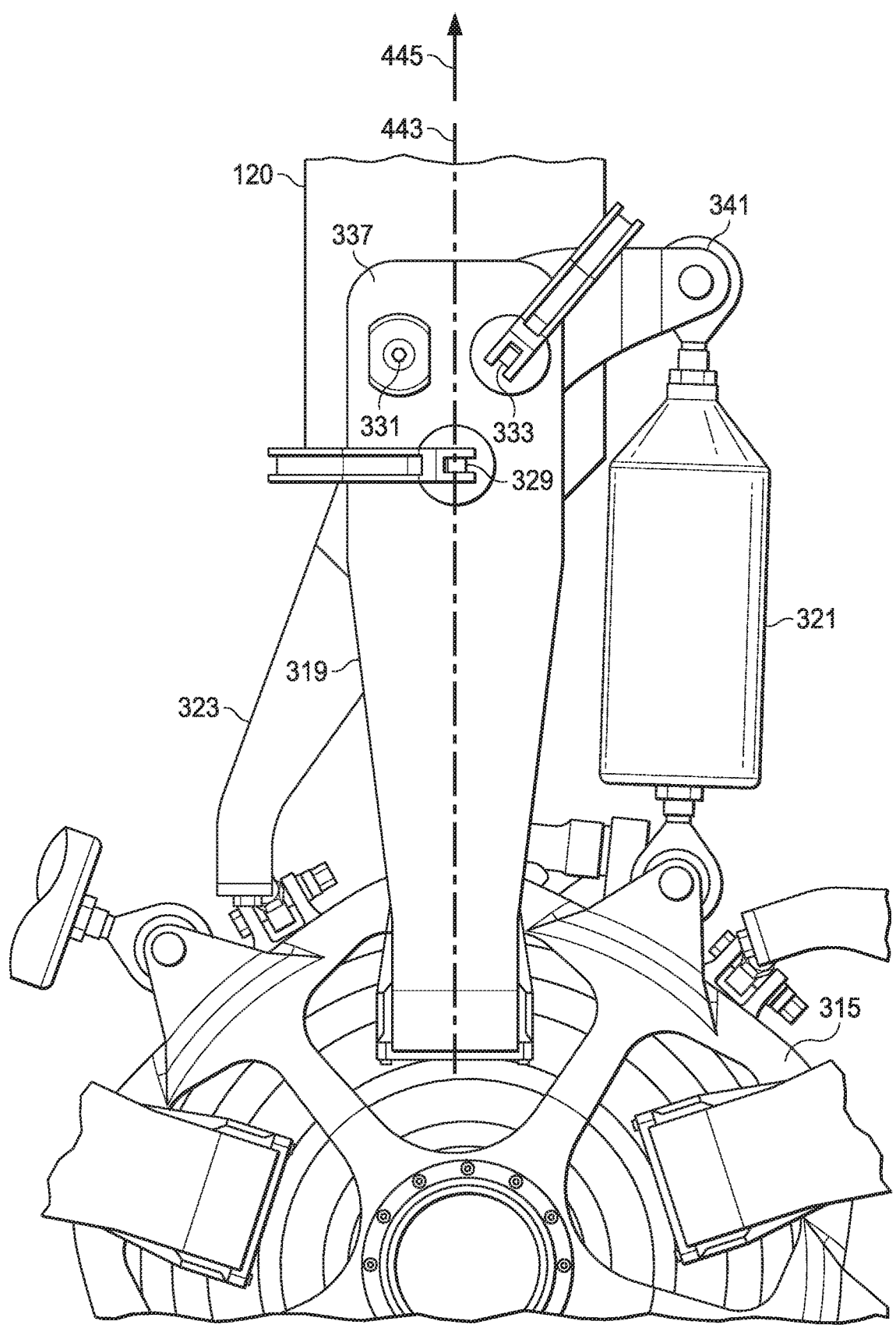
FIG. 5 representatively illustrates a top view of a portion of a main rotor assembly, in accordance with an embodiment.

In FIGS. 3-5, first bolt 329 and third bolt 333 are representatively illustrated as quick removable expandable bolts configured to be removed without the need for a tool. A pin can be removed from the lower portion, allowing a handle to be pivoted, which actuates a cam member allowing the bolt to be removed. Once first bolt 329 and third bolt 333 are removed, rotor blade 120 is free to rotate about second bolt 331. It should be appreciated that some rotorcraft operators do not have a requirement for folding rotor blades 120; as such, all first bolts 329, second bolts 133, and third bolts 333 may be conventional bolts.

Figure 6:
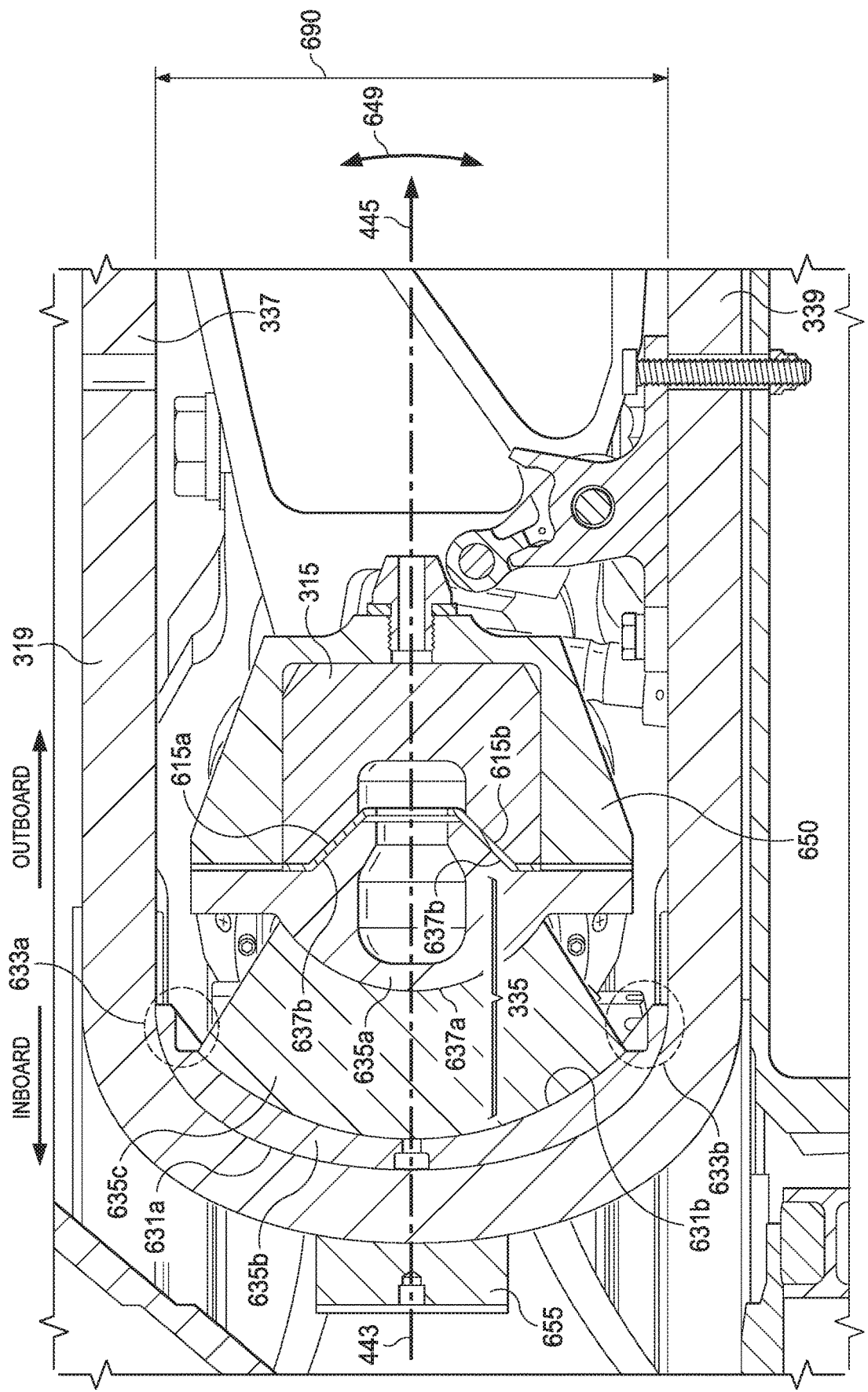
FIG. 6 representatively illustrates a cross-section of an outer-member of a centrifugal force (CF) bearing and a portion of a rotor attachment assembly, in accordance with an embodiment.

As representatively illustrated in FIG. 6, rotor grip 319 is configured for attachment to centrifugal force (CF) bearing 335 and rotor blade 120 (not illustrated in FIG. 6). Yoke 315 may be configured with a tapered recess (e.g., taper portions 615a, 615b) for seating and engagement with CF bearing 335. CF bearing 335 includes an inner-member 635a, an outer-member 635b, and an elastic member 635c (e.g., formed from an elastomeric material) disposed between and interposing the inner-member 635a and the outer-member 635b. The outer-member 635b is attached to a portion of rotor grip 319.

Outer-member 635b includes an exterior surface 631a and an interior surface 631b. Outer-member 635b exterior surface 631a extends to include exterior surface portions of upper flange 633a and lower flange 633b. Outer-member 635b exterior surface 631a (including exterior surface portions of upper flange 633a and lower flange 633b) is positively engaged with and physically contacts an interiorly disposed surface in the channel of rotor grip 319. At least a portion of outer-member 635b interior surface 631b is positively engaged with and physically contacts elastic member 635c.

In a representative aspect, upper flange 633a and lower flange 633b include "diving board" extensions that increase a spanning radius for positive engagement of outer-member 635b to the interior channel of rotor grip 319. The enlarged spanning radius provides improved communication of mechanical forces from rotor grip 319 to CF bearing 335 (and subsequently, to yoke 315). Additionally, the enlarged spanning radius also provides improved structural support of the channel of rotor grip 319. For example, as rotor grip 319 experiences centrifugal mechanical loading, there is a tendency of the upper and lower portions of rotor grip 319 to compress or deform toward each other (e.g., reducing rotor grip 319 channel distance 690). In a representative aspect, additional structural support afforded by upper flange 633a and lower flange 633b may operate to reduce fatigue or failure of rotor grip 319 associated with cycles of compression/relaxation of upper and lower portions of rotor grip 319 experienced under time-varying centrifugal loads.

The inner-member 635a includes a first surface 637a and a second surface 637b, where the second surface 637b opposes the first surface 637a. First surface 637a has a protrusion that extends in a direction toward the outer-member 635b. In an embodiment, the protrusion of first surface 637a may have, e.g., a hemispherical shape, although other protruded shapes are possible. Second surface 637b has a boss that protrudes in a direction away from the elastic member 635c. The boss has a substantially continuously tapered (e.g., conic) profile. In an assembled configuration, the boss of second surface 637b is disposed in and on a tapered recess (e.g., taper portions 615a, 615b) of yoke 315.

Figure 7:
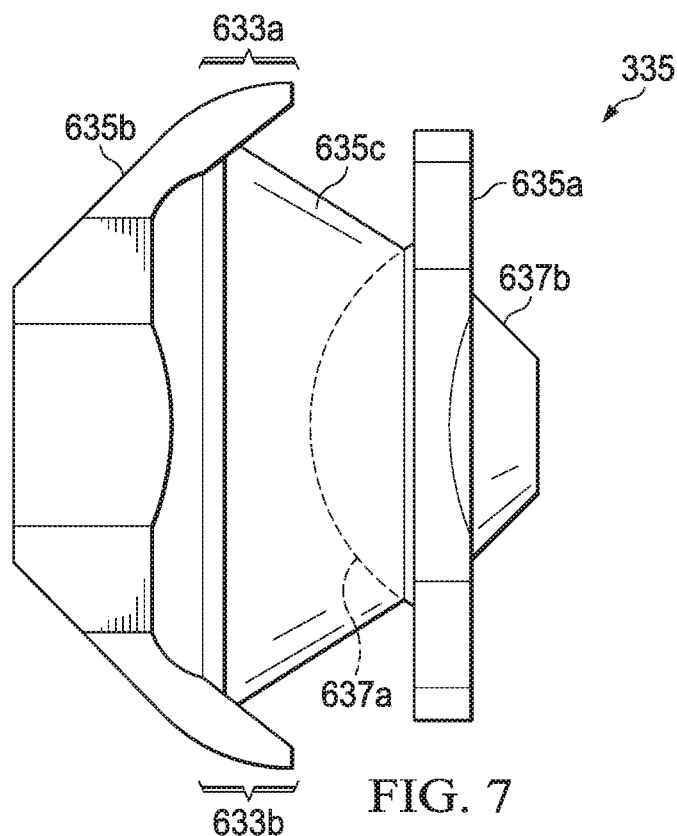
FIG. 7 representatively illustrates a side view of an outer-member of a CF bearing, in accordance with an embodiment.
Figure 8:
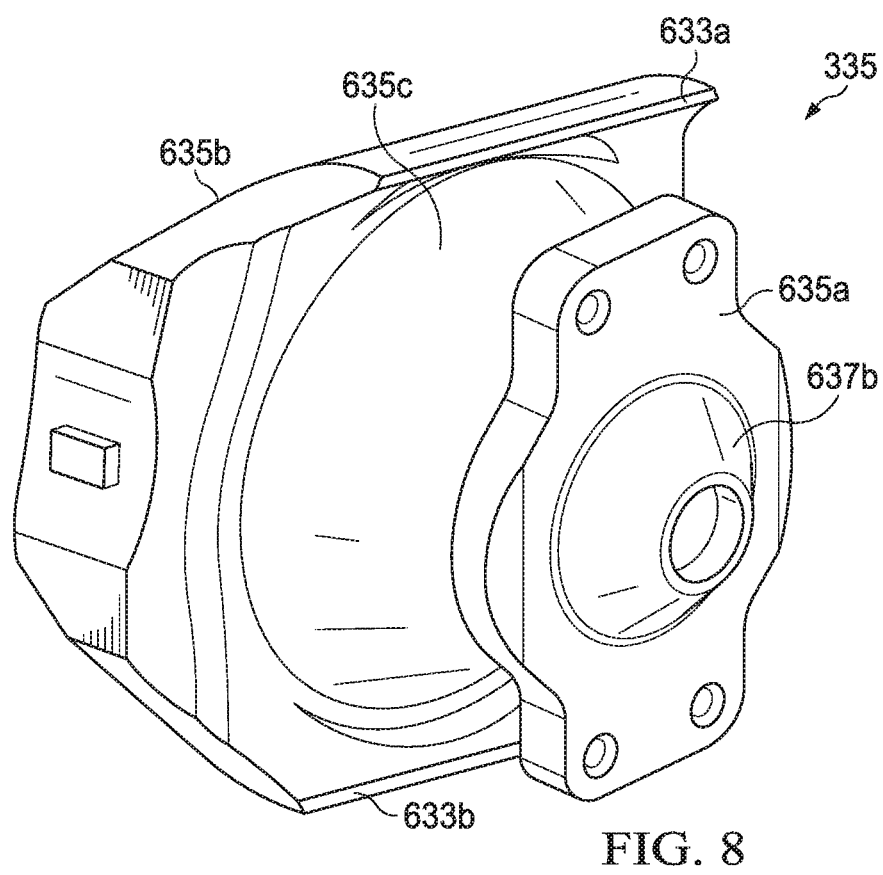
FIG. 8 representatively illustrates a perspective view of an outer-member of a CF bearing, in accordance with an embodiment.

FIG. 7 representatively illustrates a side view of a conical shear boss feature of inner member 635a of CF bearing 335, in accordance with an embodiment. FIG. 8 representatively illustrates a perspective view of the conical shear boss feature of inner member 635a of CF bearing 335, in accordance with an embodiment. The tapered profile of second surface 637b of the conical shear boss feature of inner member 635a is substantially matched to the tapered profile of the taper recess 615a, 615b of yoke 315. Accordingly, and in representative implementation, CF bearing 335 is configured to transmit at least one of centrifugal force, lateral shear, or vertical shear mechanical loads into yoke 315, whereby stress in CF bearing 335 and yoke 315 (or other associated parts) is reduced.

In a representative aspect, an inboard surface profile of outer member 635b may be configured for seating to and engagement with grip 319. In another representative aspect, an inboard surface profile of elastic member 635c may be configured for seating to and engagement with an outboard surface of outer member 635b (e.g., the inboard surface profile of elastic member 635c including a substantially hemispherical protrusion extending toward outer member 635b, although other shapes are possible). In another representative aspect, an outboard surface profile of elastic member 635c may be configured for seating to and engagement with first surface 637a of inner member 635a (e.g., the outboard surface of elastic member 635c including a substantially hemispherical cavity, although other intruded shapes are possible).

Figure 9:
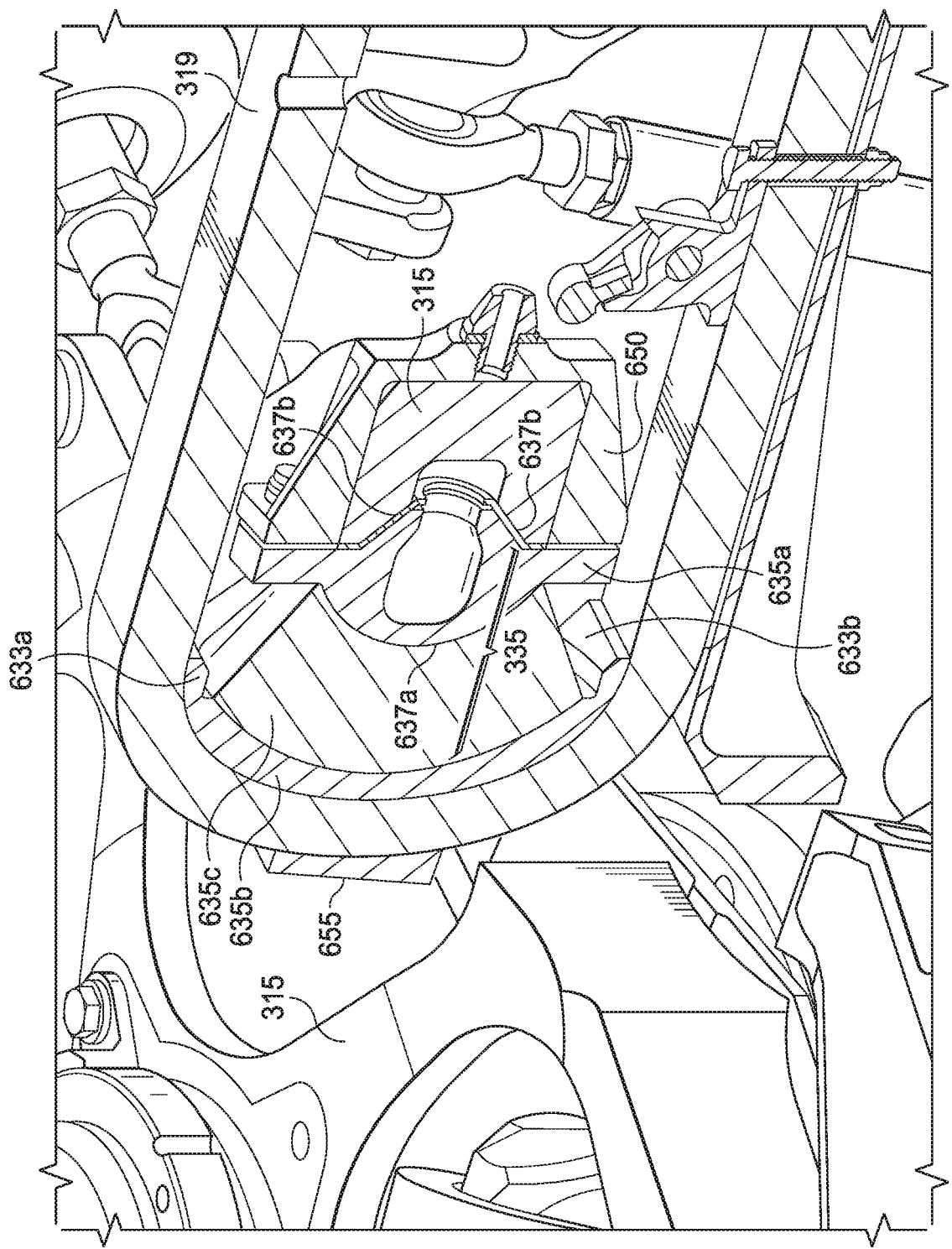
FIG. 9 representatively illustrates a perspective cut-away view of an outer-member of a CF bearing in a cut-away portion of a rotor assembly, in accordance with an embodiment.
Figure 10:
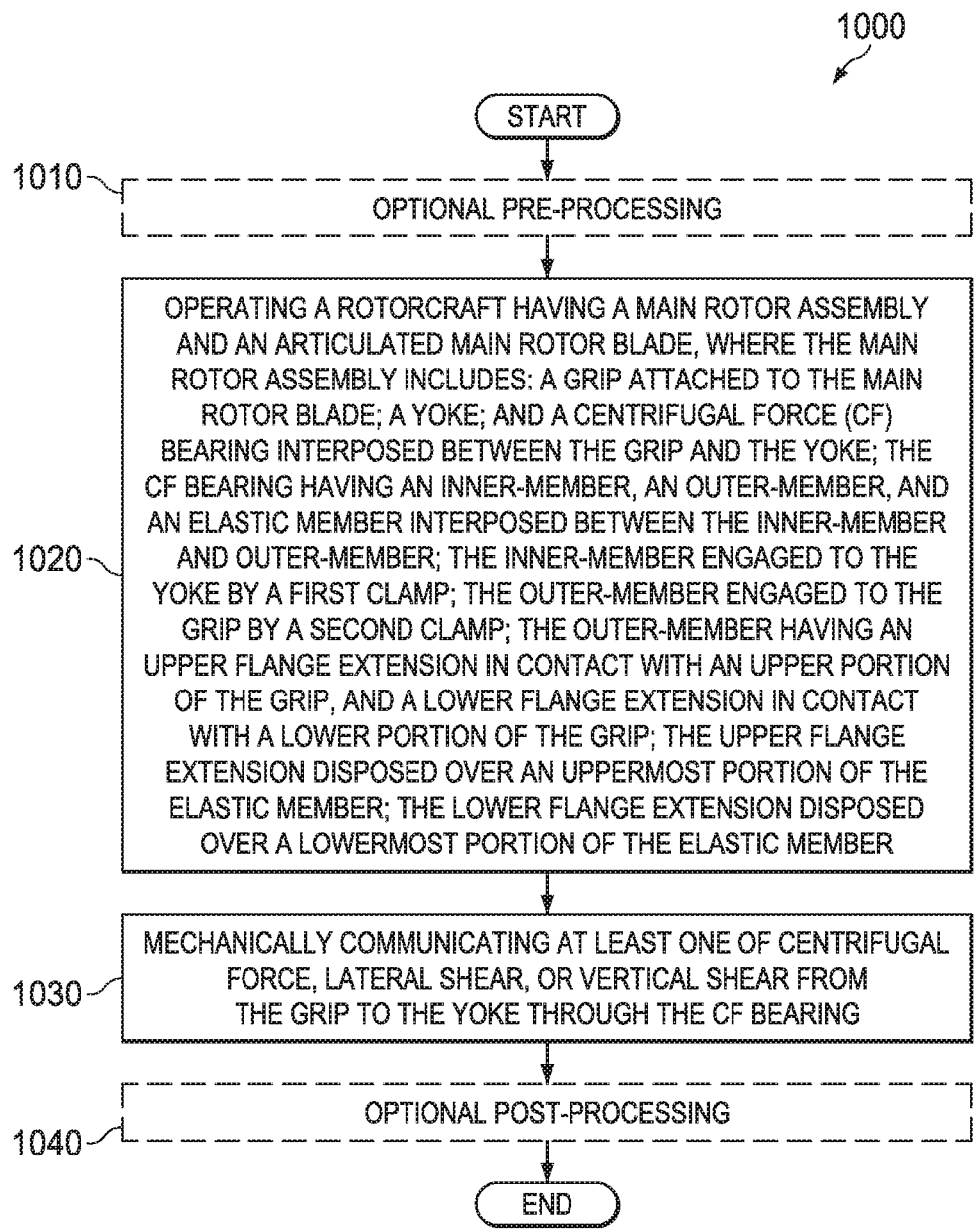
FIG. 10 representatively illustrates a method in accordance with an embodiment.

FIG. 9 representatively illustrates a perspective view of a cut-away portion of CF bearing 635 in a portion of rotor hub 110, in accordance with an embodiment. An outboard portion of CF bearing 635 (e.g., inner member 635a) may be attached to yoke 315 by inner clamp 650 (although other mechanisms of attachment are possible). An inboard portion of CF bearing 635 (e.g., outer member 635b) may be attached to grip 319 by outer clamp 655 (although other mechanisms of attachment are possible). Elastic member 635c may be registered to interposition between inner member 635a and outer member 635b by inner clamp 650 and outer clamp 655 (although other mechanisms of registration or attachment are possible).

In a representative embodiment, a centrifugal force (CF) bearing for a rotorcraft includes a first member, a second member, and a third member. The third member is interposed between the first member and the second member. The second member has a first side with a first surface, and a second side with a second surface. The second side opposes the first side. The first surface includes a first protruding feature that extends in a direction toward the first member. The second surface includes a second protruding feature that extends in a direction away from the third member. The second protruding feature has a tapered profile. The tapered profile may be continuously tapered. The second protruding feature may include a conical boss. The first protruding feature may include a substantially hemispherical or substantially ovoid shape. The first member may be configured for attachment to a rotor grip. The second member may be configured for engagement with a rotor yoke. The third member may include an elastic material. The CF bearing may be configured to communicate a mechanical load from the rotor grip through the conical boss to the rotor yoke. The tapered profile may be substantially matched for positive engagement of the conical boss in a tapered recess of the rotor yoke. The mechanical load may be at least one of centrifugal force, lateral shear, or vertical shear. The rotor grip may be one of a main rotor grip, a tail rotor grip, a prop-rotor grip, a tandem rotor grip, or a coaxial rotor grip. The rotor yoke may be a corresponding one of a main rotor yoke, a tail rotor yoke, a prop-rotor yoke, a tandem rotor yoke, or a coaxial rotor yoke. The conical boss may be configured for location to and engagement in a receiving portion of the main rotor yoke. The first member may include at least one of steel or titanium, or the like. The second member may include 6Al-4V titanium, or the like. The third member may include an elastomeric material.

In another representative embodiment, a rotor assembly includes a grip configured for attachment to a rotor blade, a yoke having a tapered recess, and a centrifugal force (CF) bearing. The CF bearing includes an inner-member, an outer-member, and an elastic member interposed between the inner-member and the outer-member. The outer-member is attached to a portion of the grip. The inner-member includes a first surface and a second surface, where the second surface opposes the first surface. The first surface includes a protrusion that extends in a direction toward the outer-member. The second surface includes a boss that protrudes in a direction away from the elastic member. The boss has a continuously tapered profile and is disposed in the tapered recess of the yoke. The outer-member may be attached to the grip with an outer-clamp. The boss may be located to the yoke by attachment of the inner-member to an inner-clamp. The continuously tapered profile may be tapered in a direction away from the elastic member. The protrusion may include a substantially hemispherical or substantially ovoid shape. The continuously tapered profile may be substantially matched to a tapered profile of the tapered recess of the yoke. The CF bearing may be configured to communicate a mechanical load from the grip through the boss to the yoke. The elastic member may be configured to communicate the mechanical load between the outer-member and the inner-member. The mechanical load may be at least one of centrifugal force, lateral shear, or vertical shear. The rotor assembly may be a main rotor assembly. The outer-member may include a first metal. The elastic member may include an elastomeric material. The inner-member may include a second metal. The first metal may include steel or titanium, or the like. The elastomeric material may include vulcanized rubber, high-density polyurethane, or the like. The second metal may include 6Al-4V titanium, or the like.

In yet another representative embodiment, a method 1000 may include steps of: optional pre-processing (e.g., preparing rotorcraft for operation, installing a CF bearing in accordance with representative embodiments, inspecting a CF bearing in accordance with representative embodiments, removing a CF bearing in accordance with representative embodiments, replacing a CF bearing in accordance with representative embodiments, combinations thereof, or the like); and operating a rotorcraft with an articulated main rotor blade, where a main rotor assembly of the rotorcraft includes a grip attached to the articulated main rotor blade, a yoke having a tapered recess, and a centrifugal force (CF) bearing interposed between the grip and the yoke. The CF bearing has an inner-member, an outer-member, and an elastic (e.g., elastomeric) member interposed between the inner-member and the outer-member. The outer-member is attached to the grip by a first clamp. The inner-member is engaged or located to the yoke by a second clamp. The inner-member has a boss that protrudes in a direction away from the elastic member. The boss has a tapered profile that is substantially matched to and disposed in the tapered recess of the yoke. Method may further include a step of mechanically communicating at least one of centrifugal force, lateral shear, or vertical shear from the grip through the CF bearing to the yoke. Method may further include one or more steps of optional post-processing (e.g., preparing rotorcraft 100 for concluding operation, concluding operation of rotorcraft, removing a CF bearing in accordance with representative embodiments, inspecting a CF bearing in accordance with representative embodiments, replacing a CF bearing in accordance with representative embodiments, or the like).

In yet another representative embodiment, a device includes a centrifugal force (CF) bearing for a rotorcraft. The CF bearing includes a first member, a second member, and a third member. The third member is interposed between the first member and the second member. The first member includes an outer surface having an upper flange extension and a lower flange extension. The upper flange extension is disposed over an upper portion of the third member. The lower flange extension is disposed under a lower portion of the third member. The second member may include a first side having a first surface, and a second side having a second surface, the second side opposing the first side. The first surface may include a first protruding feature that extends in a direction toward the first member. The second surface may include a second protruding feature that extends in a direction away from the third member. The second protruding feature may have a tapered profile. The second protruding feature may include a conical boss. The first member may be configured for attachment to a rotor grip. The second member may be configured for engagement with a rotor yoke. The third member may include an elastic material. The CF bearing may be configured to communicate a mechanical load from the rotor grip through the first member, the third member, and the second member to the rotor yoke. The mechanical load may include at least one of centrifugal force, lateral shear, or vertical shear. A profile of the outer surface of the first member may be substantially matched for positive engagement to the rotor grip. The rotor grip may be one of a main rotor grip, a tail rotor grip, a prop-rotor grip, a tandem rotor grip, or a coaxial rotor grip. The rotor yoke may be a corresponding one of a main rotor yoke, a tail rotor yoke, a prop-rotor yoke, a tandem rotor yoke, or a coaxial rotor yoke. The first member may include at least one of steel or titanium. The second member may include 6Al-4V titanium. The third member may include an elastomeric material.

In yet another representative embodiment, a system includes a rotor assembly including: a grip configured for attachment to a rotor blade; a yoke; and a centrifugal force (CF) bearing interposed between the grip and the yoke. The CF bearing includes an inner-member, an outer-member, and an elastic member interposed between the inner-member and the outer-member. The outer-member is attached to a portion of the grip. The outer-member includes an upper flange in contact with an upper portion of the grip. The upper flange is disposed over an uppermost surface of the elastic member. The outer-member includes a lower flange in contact with a lower portion of the grip. The lower flange is disposed under a lowermost surface of the elastic member. The inner-member may include a first surface and a second surface, the second surface opposing the first surface. The first surface may include a protrusion that extends in a direction toward the outer-member. The second surface may include a boss that protrudes in a direction away from the elastic member. The boss may have a continuously tapered profile that is disposed in a tapered recess of the yoke. The outer-member may be attached to the grip with an outer-clamp. The boss may be located to the yoke by attachment of the inner-member with an inner-clamp. A first outer surface profile of the upper flange may be substantially matched for positive engagement to a first surface of the upper portion of the grip. The upper flange may be interposed between the first surface of the upper portion of the grip and the uppermost surface of the elastic member. A second outer surface profile of the lower flange may be substantially matched for positive engagement to a second surface of the lower portion of the grip. The lower flange may be interposed between the second surface of the lower portion of the grip and the lowermost surface of the elastic member. The CF bearing may be configured to communicate a mechanical load from the grip through the outer-member to the yoke. The elastic member may be configured to communicate the mechanical load between the outer-member and the inner-member. The mechanical load may include at least one of centrifugal force, lateral shear, or vertical shear. The rotor assembly may be one of a main rotor assembly, a tail rotor assembly, a prop-rotor assembly, a tandem rotor assembly, or a coaxial rotor assembly. The outer-member may include a first metal. The elastic member may include an elastomeric material. The inner-member may include a second metal. The first metal may include steel or titanium. The elastomeric material may include vulcanized rubber. The second metal may include 6Al-4V titanium.

In still another representative embodiment, a method 1000 may include steps of: optional pre-processing 1010 (e.g., preparing rotorcraft 100 for operation, installing a CF bearing 335 in accordance with representative embodiments, inspecting a CF bearing 335 in accordance with representative embodiments, removing a CF bearing 335 in accordance with representative embodiments, replacing a CF bearing 335 in accordance with representative embodiments, combinations thereof, or the like); and operating 1020 a rotorcraft with an articulated main rotor blade, where a main rotor assembly of the rotorcraft includes a grip attached to the articulated main rotor blade, a yoke, and a centrifugal force (CF) bearing interposed between the grip and the yoke. The CF bearing has an inner-member, an outer-member, and an elastic (e.g., elastomeric) member interposed between the inner-member and the outer-member. The inner-member is engaged to the yoke by a first clamp. The outer-member is attached to the grip by a second clamp. The outer-member includes an upper flange in contact with an upper portion of the grip. The outer-member also includes a lower flange in contact with a lower portion of the grip. The upper flange is disposed over an uppermost portion of the elastic member, and the lower flange is disposed under a lowermost portion of the elastic member. Method 1000 may further include a step of mechanically communicating 1030 at least one of centrifugal force, lateral shear, or vertical shear from the grip through the CF bearing to the yoke. Method 1000 may further include one or more steps of optional post-processing 1040 (e.g., preparing rotorcraft 100 for concluding operation, concluding operation of rotorcraft 100, removing a CF bearing 335 in accordance with representative embodiments, inspecting a CF bearing 335 in accordance with representative embodiments, replacing a CF bearing 335 in accordance with representative embodiments, combinations thereof, or the like).

As used herein, the terms "comprises," "comprising," "includes," "including," "has," "having," or any contextual variant thereof, are intended to reference a non-exclusive inclusion. For example, a process, product, article, or apparatus that comprises a list of elements is not necessarily limited to only those elements, but may include other elements not expressly listed or inherent to such process, product, article, or apparatus. Furthermore, unless expressly stated to the contrary, "or" refers to an inclusive or and not an exclusive or. That is, the term "or" as used herein is generally intended to mean "and/or" unless otherwise indicated. For example, a condition "A or B" is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural connotations for such term, unless the context clearly indicates otherwise.

Although steps or operations may be presented in a specific order, this order may be changed in different embodiments. In some embodiments, to the extent multiple steps are shown as sequential in the preceding description, some combination of such steps in alternative embodiments may be performed at a same time. The sequence of operations described herein may be interrupted, suspended, or otherwise controlled by another process.

It will also be appreciated that one or more elements illustrated in the Figures may also be implemented in a more-separated or more-integrated manner, or even removed or rendered inoperable in certain cases, as may be useful in accordance with particular applications and embodiments. Additionally, any lines or arrows in the Figures should be considered only as representative, and therefore not limiting, unless otherwise specifically noted.

Examples or illustrations provided herein are not to be regarded in any way as restrictions on, limits to, or express definitions of any term or terms with which they are associated. Instead, these examples or illustrations are to be regarded as being described with respect to a particular embodiment and as merely illustrative. Those skilled in the art will appreciate that any term or terms with which these examples or illustrations are associated will encompass other embodiments that may or may not be given therewith or elsewhere in the specification, and all such embodiments are intended to be included within the scope of that term or set of terms. Language designating such non-limiting examples and illustrations includes, but is not limited to: "for example," "for instance," "e.g.," "etc.," "or the like," "in a representative embodiment," "in one embodiment," "in another embodiment," "in some embodiments," or the like. Reference throughout this specification to "one embodiment," "an embodiment," "a representative embodiment," "a particular embodiment," or "a specific embodiment," or contextually similar terminology, means that a particular feature, structure, property, or characteristic described in connection with the described embodiment is included in at least one embodiment, but may not necessarily be present in all embodiments. Thus, respective appearances of the phrases "in one embodiment," "in an embodiment," or "in a specific embodiment," or similar terminology in various places throughout the description are not necessarily referring to the same embodiment. Furthermore, particular features, structures, properties, or characteristics of any specific embodiment may be combined in any suitable manner with one or more other embodiments.

The scope of the present disclosure is not intended to be limited to the particular embodiments of any process, product, machine, article of manufacture, assembly, apparatus, means, methods, or steps herein described. As one skilled in the art will appreciate, various processes, products, machines, articles of manufacture, assemblies, apparatuses, means, methods, or steps, whether presently existing or later developed, that perform substantially the same function or achieve substantially similar results in correspondence to embodiments described herein, may be utilized according to their description herein. The appended claims are intended to include within their scope such processes, products, machines, articles of manufacture, assemblies, apparatuses, means, methods, or steps.

Benefits, other advantages, and solutions to problems have been described herein with regard to representative embodiments. However, any benefits, advantages, solutions to problems, or any component thereof that may cause any benefit, advantage, or solution to occur or to become more pronounced are not to be construed as critical, required, or essential features or components.

What is claimed is:

1. A device, comprising:
   a centrifugal force (CF) bearing for a rotorcraft, the CF bearing comprising:
      a first member,
      a second member,
      and a third member, the first, second, and third members being aligned along a common pitch change axis, the third member interposed between the first member and the second member,
   wherein the second member includes first protruding feature that extends in a direction toward the first member, the first protruding feature fitting within a recess in the third member and in contacting engagement with a surface of the third member that defines the recess,
   the first member comprising an outer surface, the outer surface comprising an upper flange extension and a lower flange extension, the upper flange extension extending in a direction non-orthogonal to the common pitch change axis and being disposed over an upper portion of the third member, the lower flange extension disposed under a lower portion of the third member, wherein the upper flange extension has a distal end and a proximal end and wherein the distal end is closer to the second member than is the proximal end and the distal end is more radially spaced apart from the common pitch change axis than is the proximal end.

2. The device of claim 1, wherein the second member comprises a first side having a first surface, and a second side having a second surface, the second side opposing the first side, wherein:
   the first surface comprises a first protruding feature that extends in a direction toward the first member;
   the second surface comprises a second protruding feature that extends in a direction away from the third member; and
   the second protruding feature comprises a tapered profile.

3. The device of claim 2, wherein the second protruding feature comprises a conical boss.

4. The device of claim 3, wherein:
   the first member has been configured for attachment to a rotor grip;
   the second member has been configured for engagement with a rotor yoke;
   the third member comprises an elastic material; and
   the CF bearing has been configured to communicate a mechanical load from the rotor grip through the first member, the second member, and the third member to the rotor yoke.

5. The device of claim 4, wherein the mechanical load comprises at least one of centrifugal force, lateral shear, or vertical shear.

6. The device of claim 5, wherein a profile of the outer surface of the first member has been matched for positive engagement to the rotor grip.

7. The device of claim 6, wherein:
   the rotor grip has been one of a main rotor grip, a tail rotor grip, a prop-rotor grip, a tandem rotor grip, or a coaxial rotor grip; and
   the rotor yoke has been a corresponding one of a main rotor yoke, a tail rotor yoke, a prop-rotor yoke, a tandem rotor yoke, or a coaxial rotor yoke.

8. The device of claim 1, wherein:
   the first member comprises at least one of steel or titanium;
   the second member comprises 6Al-4V titanium; and
   the third member comprises an elastomeric material.

9. A system, comprising:
   a rotor assembly comprising:
      a grip configured for attachment to a rotor blade;
      a yoke having an opening therethrough, wherein the grip extends through the opening in the yoke; and
      a centrifugal force (CF) bearing interposed between the grip and the yoke, wherein:
         the CF bearing comprises an inner-member, an outer-member, and an elastic member interposed between the inner-member and the outer-member, respective center points of the inner-member, the outer-member, and the elastic member being aligned along a common axis, wherein the inner-member includes first protruding feature that extends in a direction toward the outer-member, the first protruding feature fitting within a recess in the elastic member and in contacting engagement with a surface of the elastic member that defines the recess, the inner-member further includes a second protruding feature that extends in a direction away from the outer-member, the second protruding feature fitting within a recess in the yoke;
         the outer-member has been attached to a portion of the grip;
         the outer-member comprises an upper flange in contact with an upper portion of the grip;
         the upper flange has been disposed over an uppermost surface of the elastic member, the upper flange extending in a direction non-orthogonal to the common axis, the upper flange having a distal end and a proximal end, wherein the distal end is closer to the inner-member than is the proximal end and the distal end is more radially spaced apart from the common axis than is the proximal end;
the outer-member comprises a lower flange in contact with a lower portion of the grip; and
the lower flange has been disposed under a lowermost surface of the elastic member.

10. The system of claim 9, wherein:
the second protruding feature has a continuously tapered profile that has been disposed in a tapered recess of the yoke.

11. The system of claim 10, wherein the outer-member has been attached to the grip with an outer-clamp, and the second protruding feature has been located to the yoke by attachment of the inner-member with an inner-clamp.

12. The system of claim 9, wherein:
a first outer surface profile of the upper flange has been matched for positive engagement to a first surface of the upper portion of the grip; and
the upper flange has been interposed between the first surface of the upper portion of the grip and the uppermost surface of the elastic member.

13. The system of claim 12, wherein:
a second outer surface profile of the lower flange has been matched for positive engagement to a second surface of the lower portion of the grip; and
the lower flange has been interposed between the second surface of the lower portion of the grip and the lowermost surface of the elastic member.

14. The system of claim 9, wherein:
the CF bearing has been configured to communicate a mechanical load from the grip through the outer-member to the yoke; and
the elastic member has been configured to communicate the mechanical load between the outer-member and the inner-member.

15. The system of claim 14, wherein the mechanical load comprises at least one of centrifugal force, lateral shear, or vertical shear.

16. The system of claim 9, wherein the rotor assembly has been one of a main rotor assembly, a tail rotor assembly, a prop-rotor assembly, a tandem rotor assembly, or a coaxial rotor assembly.

17. The system of claim 9, wherein:
the outer-member comprises a first metal;
the elastic member comprises an elastomeric material; and
the inner-member comprises a second metal.

18. The system of claim 17, wherein:
the first metal comprises steel or titanium;
the elastomeric material comprises vulcanized rubber; and
the second metal comprises 6Al-4V titanium.

19. A method, comprising:
operating a rotorcraft with an articulated main rotor blade, by
receiving a pilot control input; and
in response to the pilot control input, changing a configuration of a main rotor assembly of the rotorcraft;
wherein the main rotor assembly of the rotorcraft comprises:
a grip that has been attached to the articulated main rotor blade;
a yoke, wherein the grip extends through an opening in the yoke; and
transmitting a mechanical load from the grip to the yoke through a centrifugal force (CF) bearing that has been interposed between the grip and the yoke, wherein:
the CF bearing has an inner-member, an outer-member, and an elastic member disposed between the inner-member and the outer-member, the inner-member, the outer-member, and the elastic member being aligned along a common pitch change axis;
the inner-member includes a protruding portion that fits within a recess formed in the yoke; and
the outer-member comprises an upper flange in contact with an upper portion of the grip, and a lower flange in contact with a lower portion of the grip, wherein the upper flange has been disposed over an uppermost portion of the elastic member, and the lower flange has been disposed under a lowermost portion of the elastic member, and further wherein the upper flange has a distal end and a proximal end and wherein the distal end is closer to the inner-member than is the proximal end and the distal end is more radially spaced apart from the common pitch change axis than is the proximal end.

20. The method of claim 19, further comprising mechanically communicating at least one of centrifugal force, lateral shear, or vertical shear from the grip through the CF bearing to the yoke.

* * * * *